United States Patent Office 2,844,468
Patented July 22, 1958

2,844,468

SOY PROTEIN WHIPPING COMPOSITIONS AND PROCESS FOR THE PREPARATION THEREOF

Robert C. Gunther, Galesburg, Ill., assignor to Gunther Products, Inc., Galesburg, Ill., a corporation of Illinois No Drawing. Application April 26, 1955
Serial No. 504,109

8 Claims. (Cl. 99—114)

This invention relates to a new whipping composition derived from soy protein for use in food products.

In the food industry, and in particular in the confectionery field, proteinaceous materials such as egg white and soy albumen have been used extensively for many years as aerating agents. By an aerating agent is meant a material capable of entrapping air in a basic syrup-sugar mix upon whipping or beating. The basic requirements of a good aerating material are two-fold. First, it must have the ability to whip to high volume (or entrap large amounts of air) and secondly, it must have the inherent property or ability to stabilize the air cells formed so as to give the finished product a smooth, fine-celled texture and maximum storage stability.

Although egg protein is satisfactory in many respects its general usage suffers from the fact that it is high in cost and also in certain applications lacks sufficient whipping ability.

Vegetable proteins, such as soy proteins, although much more economically priced than egg albumen, have not heretofore possessed the necessary properties that would make them compete favorably with egg. The vegetable proteins have not, heretofore, been able to produce the smooth, fine-celled structure of egg nor have they been able to furnish the desired storage stability so characteristic of egg products.

One of the objects of the present invention is to provide a composition which can be whipped to produce a whipped composition that is firm when hot and not rubbery when cold. Gelatin, for example, is very thin when hot and rubbery after it has been cooled.

Another object of the invention is to produce a whippable protein composition which can be whipped on commercial equipment to produce whipped compositions of satisfactory stability.

A further object of the invention is to provide a new and improved process for producing compositions of the type described. Other objects will appear hereinafter.

In accordance with this invention an entirely new whipping composition is provided which when used in the conventional manner in confectionery frappés, nougats, and the like, produces not only a product with a smooth egg-like texture and a storage life comparable to egg, but one which whips faster and to a better volume than egg. Moreover, this new whipping composition can be provided by the process of the invention at a cost only slightly higher than the economically priced soy proteins.

The present invention is predicated upon the discovery that polyphosphate compounds in combination with gelatin and an enzyme modified soy protein produce an entirely new whipping composition which cannot be duplicated by combination of any two of the ingredients or by any of the ingredients singly. Particular emphasis is placed upon the polyphosphate compounds which may be utilized in this invention. It has been found that only those phosphate compounds capable of sequestration function satisfactorily in this new type whipping composition.

Examples of such compounds are sodium hexametaphosphate, sodium tripolyphosphate, sodium tetraphosphate, tetra sodium pyrophosphate, and the like. It is to be understood that these phosphates are only examples of compounds performing satisfactorily in the invention and that under no circumstances is this invention limited to these exemplary compounds.

In brief, this invention comprises a whipping composition made up of an enzyme modified soy protein in an amount of 70% to 90% by weight, a gelatin in an amount of 3% to 15% by weight, and a sequestering type edible water soluble polyphosphate in an amount of 5% to 15% by weight. The final pH of the composition is preferably adjusted to between 4.0 and 6.0. In one embodiment of the invention sodium aluminum sulfate or similar type compound is added to provide even better texture and longer storage stability.

A comparison of a conventional type soy protein, egg albumen and the new whipping composition (herein designated as "G-400" for convenience) was made, each being used in 2% concentration in a frappé made with an 80/20 corn syrup-sucrose ratio. Densities were obtained on the frappés immediately after whipping and again after 24 hours' storage at 70° F. On the basis of this test, if a frappé were 100% stable it would show no gain in weight after 24 hours' storage; likewise the more stable a frappé, the less the gain in weight. The results of this test are presented in Table A.

TABLE A

| | Original Whip Volume, ounces/gallon | Weight after 24 hrs. storage, ounces/gallon |
|---|---|---|
| Modified Soy Protein (Brand 1) | 64 | 102 |
| Modified Soy Protein (Brand 2) | 65 | 86 |
| Egg Albumen (run No. 1) | 64 | 77 |
| Egg Albumen (run No. 2) | 63 | 78 |
| G-400 of Example II (run No. 1) | 60 | 76 |
| G-400 of Example II (run No. 2) | 61 | 75 |

The new whipping composition, G-400, was also compared with conventional soy protein and egg albumen in accelerated aging tests at 110° F. The whipping components were used, as in Table A, at a 2% concentration. The results of this test are presented in Table B.

TABLE B

| | Original Whip Volume, Ounces/gallon | Stability at 110° F., Days before Syrup Break |
|---|---|---|
| Modified Soy Protein (Brand 1) | 64 | 2 |
| Modified Soy Protein (Brand 2) | 65 | 3 |
| Egg Albumen (run No. 1) | 64 | 15 |
| Egg Albumen (run No. 2) | 63 | 12 |
| G-400 of Example II (run No. 1) | 60 | 10 |
| G-400 of Example II (run No. 2) | 61 | 12 |

In Table C is presented a comparison of the 24 hour storage stabilities of a series of whipping compositions formulated so as to demonstrate the fact that it is only the combination of modified soy protein, gelatin and sequestering phosphates which produces the whipping composition which is the basis of this invention. Each composition was used in a 2% concentration in a frappé made with a 60/40 corn syrup-sucrose weight ratio. Densities were obtained on the frappés immediately after whipping, and again after 24 hours' storage at 70° F. On the basis of this test if a frappé were 100% stable it would show no gain in weight after 24 hours' storage; likewise, the more stable a frappé, the less the gain in weight.

TABLE C

|  | Original Whip Volume, ounces/ gallon | Weight after 24 hrs. storage, ounces/ gallon |
| --- | --- | --- |
| (1) Modified Soy Protein | 57 | 104 |
| (2) Modified Soy Protein Gelatin | 56 | 88 |
| (3) Modified Soy Protein Sodium hexametaphosphate | 57 | 101 |
| (4) Modified Soy Protein Sodium hexametaphosphate Gelatin | 60 | 72 |

The enzyme modified soy protein utilized in this invention may be made in a conventional manner, for example, by steeping soybean material in acidified water to remove the bulk of the soluble nitrogen free extract, subjecting the remaining material to hydrolysis with an enzyme, separating the solubles from the insolubles and concentrating the solubles.

A suitable method for manufacturing a soy protein employed for the purpose of the invention is described in U. S. Patent 2,489,173, column 4, lines 4 to 65. The procedure can be varied somewhat, depending upon the manner in which the resultant composition is to be whipped. The soy protein made by the aforesaid procedure and subsequently combined with gelatin and a polyphosphate in the proportions previously stated is an excellent product for whipping in a vertical type beater where the whipping is accomplished in a few minutes.

Where the whipping composition is whipped in a horizontal type beater requiring a whipping time of around 15 to 20 minutes, it is preferable to modify the procedure of column 4 of U. S. Patent 2,489,173 in the following manner. In the first stage where the solvent extracted soybean flakes are treated with sulfur dioxide gas and washed, the washing is continued for one or two more times to remove nitrogen-free materials. When the slurry is heated with live steam, the temperature is varied within the range of 75° F. to 110° F. In general, the higher the temperature, the less the whipping value of the soy protein. In the subsequent treatment with pepsin, the amount of pepsin can be varied, depending upon the pH and the temperature. If the pH is raised above 2.5 more pepsin can be used. If the temperature is raised the amount of pepsin can be decreased. The range of the quantity of pepsin employed is preferably from 0.25 to 1%. In making a product suitable for whipping on a horizontal type beater sodium chloride which is employed in the aforementioned process of U. S. Patent 2,489,173, is preferably omitted. The addition of sodium chloride normally functions to dissolve a portion of the unhydrolyzed protein. Hence, the omission of the sodium chloride results in a separation of a greater quantity of the unhydrolyzed protein when the product is filtered. In making a product suitable for use in the slower type horizontal beaters, the pepsin-treated soy protein mixture is preferably heated to 160° F. for 1 to 2 hours and then enough sodium hydroxide is added to give a pH of 3.75, after which the product is filtered. The filtration can be effected at a pH within the range of 2.5 to 5.5. Filter aids such as diatomaceous earth or kieselguhr are added to assist in the separation of the insoluble materials. Settling and centrifuging can also be employed to separate the insoluble materials. The pH before spray drying the filtrate can be within the range of 3.5 to 7. The soy protein employed in making a whipping composition for horizontal beating equipment can be concentrated at temperatures of 180° F. to 200° F.

The gelatin used in conjunction with the protein and phosphate may be either the acid type or alkaline type, although in the practice of the invention the acid-cured gelatin appears to function more satisfactorily. Gelatins ranging in Bloom-strength from 60 Bloom to 300 Bloom, have been used in the practice of the invention, the particular gelatin employed being dependent upon the type of product desired. In practice, it has been found that the higher Bloom gelatins (e. g., 100 to 300 Bloom), produce a more versatile and generally more desirable product.

In making a composition adapted to be whipped on a vertical beater in a relatively short time, the gelatin and polyphosphate preferably are dissolved in the protein solution and spray dried with the protein. This has the advantage that the gelatin is thoroughly dissolved in the relatively short whipping time employed in this beater.

The addition of sodium aluminum sulfate $$[NaAl(SO_4)_2]$$

serves to toughen the gelatin component of the composition and adds to the stability of the whipped composition. The quantity of sodium aluminum sulfate can be within the range from 0% to 5% and if sodium aluminum sulfate is used, it is preferably employed in an amount corresponding to about 2% to about 3% by weight of the whipping composition.

The pH of the composition during whipping is preferably within the range from about 4.5 to 5.5.

The precise method by which the gelatin, polyphosphate and degraded soy protein function, whether by combination or interaction is not known. The following theory may be offered, however, as an explanation in part of the mechanism by which the whipping composition is formed. Since only those phosphates capable of sequestration function satisfactorily in this invention, it may be assumed that the primary stabilization mechanism occurs by some form of sequestration. However, it must also be recognized that these same sequestering type compounds may also function as protein precipitants at appropriate pH's. The fact that orthophosphates, which possess some protein precipitation properties, do not function in this invention, leads to the belief that the unusual properties of the whipping composition may arise from a combination of two factors, namely (1) protein precipitation, and (2) sequestration. Evidence at the present time indicates that it undoubtedly is a combination of the two factors. Investigations have shown that with any particular degraded soy protein there is an optimum pH at which the stabilization mechanism occurs, such a pH usually occurring below 6.0 and above 4.5. On the other hand, studies of a series of compounds capable of different degrees of sequestration indicates that those with the highest sequestering properties function much more satisfactorily than those of lower sequestering ability. Whether by sequestration or precipitation, or both, the protein in the composition, that is, both the gelatin and the soy protein, are modified by polyphosphates in such a manner that, upon whipping, the thin walls between the air cells are materially strengthened so as to provide exceptional stiffness and enhanced storage stability in the final whipped composition.

The ingredients used in this invention may be mixed in any conventional manner. The gelatin, polyphosphate and any other desired salts may be first dissolved in water, their solution added to a solution of the modified soy protein, and the resultant solution spray dried according to conventional practices, or the added salts may be dry blended with the soy protein. In any case, it has been found advantageous to spray dry the desired polyphosphate with the soy protein to insure proper homogeneity in the final whipping composition.

This invention will be further illustrated by the following examples.

*Example I*

One hundred and eighteen pounds of acid-cured gelatin, 150 Bloom, is added with vigorous agitation to 1000 pounds of cold water. The gelatin is allowed to swell for 2 hours and the mix is then slowly heated over a one hour interval to 130° F. whereupon the gelatin is completely dissolved. This gelatin solution is then added with agitation to 21,000 pounds of a soy protein solution containing 2,554 pounds of pepsin modified soy protein (prepared as described in U. S. Patent 2, 489,173), at a pH of 4.4. To this solution is added 925 pounds of an aqueous solution containing 176 pounds of sodium hexametaphosphate, 44 pounds of sodium aluminum sulfate, and 58 pounds citric acid. The final solution is adjusted to a pH of 4.5 and spray dried.

*Example II*

To 24,000 pounds of aqueous solution containing 1800 pounds pepsin modified soy protein at a pH of 5.0 was added 600 pounds of an aqueous solution containing 214 pounds of sodium tetraphosphate. This solution was then spray dried in a conventional manner. Five hundred pounds of the spray dried product was dry blended with 47.5 pounds of acid-cured gelatin (200 Bloom) and 11 pounds of sodium aluminum sulfate.

The final blended product was a white powder which exhibited exceptional whipping and stability properties as outlined above in Tables A and B.

*Example III*

A confectionery frappé was prepared in the following manner.

0.6 pound G-400 of Example II was dissolved in 1.2 pounds of water. This solution was added to 12 pounds of corn syrup in a horizontal type confectionery beater. To this mix was added a "cooked bob" (consisting of 6 pounds of corn syrup, 12 pounds of cane sugar with enough water to dissolve, and the mass cooked to 240° F.). The mixture was beaten for 20 minutes to produce a light, stiff frappé with exceptional texture and storage life.

*Example IV*

A chewy nougat was prepared from the following ingredients:

1½ lbs. G-400 of Example I
  3 lbs. water
  60 lbs. corn syrup
  40 lbs. cane sugar
  4 lbs. confectioner's fat
  4 ozs. salt
  Flavor to suit The G-400 of Example I was dissolved in water and added to 12 pounds of corn syrup in a vertical beater. The mixture was beaten to a light fluff.

48 pounds of corn syrup and 40 pounds of sugar was cooked to 252° F. and allowed to cool to 240° F. This "hot bob" was added slowly to the fluff with the mixer on slow speed. It was then mixed several minutes longer on medium speed. The melted (not hot) fat, salt and flavor, was then added and the mix slabbed.

This makes a light, good eating candy with excellent standup properties.

*Example V*

A short nougat was prepared from the following ingredients:

2 lbs. G-400 of Example II
  8 lbs. water
  15 lbs. 4X sugar
  60 lbs. corn syrup
  45 lbs. sugar
  4 lbs. confectioner's fat
  4 ozs. salt The G-400 of Example II was dissolved in 8 pounds lukewarm water. This solution was then added to 15 pounds of the corn syrup in a vertical beater. After mixing well, the 15 pounds of 4X sugar was added. The mix was beaten to a light stiff fluff.

The remaining 45 pounds of corn syrup and 45 pounds of sugar were cooked to 274° F. to 278° F. The hot batch was added slowly to the fluff and then mixed on medium speed until the mixture showed some shortness. The mix was finally beaten on low speed during the addition of fat, salt and flavors.

This makes a fine eating, short type nougat which will stand up without coating. If desired, the slabbed candy may be held at about 95° F. to increase development of the grain.

It will be observed that in Example I the approximate relative weight proportions of the components on a dry basis are as follows:

| | Percent |
|---|---|
| Soy protein | 87.4 |
| Gelatin | 4.1 |
| Sodium hexametaphosphate | 6.8 |
| Sodium aluminum sulfate | 1.7 | exclusive of flavoring components, i. e., citric acid.

In Example II the approximate relative weight proportions of the components on a dry basis, exclusive of flavoring, are:

| | Percent |
|---|---|
| Soy protein | 80.2 |
| Gelatin | 8.5 |
| Sodium tetraphosphate | 9.5 |
| Sodium aluminum sulfate | 1.8 |

As previously indicated, the presence of the sodium aluminum sulfate increases the toughening action and hence tends to prevent breaking down of the protein, especially during the long beating period in a horizontal type beater. The presence of the gelatin in powder form in the composition of Example II tends to retard the dissolution of the gelatin and hence this composition is especially suitable for employment in a horizontal type beater where the whipping action is prolonged. In both cases excellent results are obtained in the manufacture of whipped products on a commercial scale. The whipped compositions of the invention are firm when hot but are not rubbery when cooled. The compositions of the invention are especially suitable where it is desirable to produce whipped products that are relatively short as contrasted with products that are stringy, rubbery or elastic.

The invention is hereby claimed as follows:

1. A whipping composition comprising the following components on a dry basis by weight:

| | Percent |
|---|---|
| Enzyme modified soy protein | 70–90 |
| Gelatin | 3–15 |
| Sequestering, edible, water soluble polyphosphate | 5–15 |
| Sodium aluminum sulfate | 0–5 |

2. A whipping composition comprising the following components on a dry basis by weight:

| | Percent |
|---|---|
| Enzyme modified soy protein | 87.4 |
| Gelatin | 4.1 |
| Sodium hexametaphosphate | 6.8 |
| Sodium aluminum sulfate | 1.7 | exclusive of flavoring components.

3. A whipping composition comprising the following components on a dry basis by weight:

| | Percent |
|---|---|
| Enzyme modified soy protein | 80.2 |
| Gelatin | 8.5 |
| Sodium tetraphosphate | 9.5 |
| Sodium aluminum sulfate | 1.8 | exclusive of flavoring components.

4. A whipping composition comprising the following components on a dry basis by weight:

| | Percent |
|---|---|
| Enzyme modified soy protein | 70–90 |
| Acid cured gelatin ranging in Bloom strength from 100 to 300 Bloom | 3–15 |
| Sequestering, edible, water soluble polyphosphate | 5–15 |
| Sodium aluminum sulfate | 0–5 |

5. The process of preparing a whipping composition which comprises bringing together in intimate admixture enzyme modified soy protein, gelatin and a sequestering, edible, water soluble polyphosphate in the following approximate weight proportions, calculated on a dry basis:

| | Percent |
|---|---|
| Enzyme modified soy protein | 70–90 |
| Gelatin | 3–15 |
| Sequestering, edible, water soluble polyphosphate | 5–15 |
| Sodium aluminum sulfate | 0–5 | at least two of said components being blended together in the form of their aqueous solutions, and the resultant product being dried.

6. A process of preparing a whipping composition which comprises dissolving in water an acid cured gelatin having a Bloom within the range of 100 to 300, mixing the gelatin solution with an enzyme modified soy protein solution in water and adding to the resultant solution a sequestering, water soluble, edible polyphosphate and sodium aluminum sulfate, the approximate relative proportions of said components on a dry basis being within the range of:

| | Percent |
|---|---|
| Enzyme modified soy protein | 70–90 |
| Gelatin (acid cured) | 3–15 |
| Sequestering, edible, water soluble polyphosphate | 5–15 |
| Sodium aluminum sulfate | 0–5 | and spray drying the resultant product.

7. A process of preparing a whipping composition which comprises dissolving in water an acid cured gelatin having a Bloom within the range of 100 to 300, mixing the gelatin solution with an enzyme modified soy protein solution in water and adding to the resultant solution a sequestering, water soluble, edible polyphosphate and sodium aluminum sulfate, the approximate relative proportions of said components on a dry basis being:

| | Percent |
|---|---|
| Enzyme modified soy protein | 87.4 |
| Acid cured gelatin | 4.1 |
| Sequestering, water soluble, edible polyphosphate | 6.8 |
| Sodium aluminum sulfate | 1.7 | and spray drying the resultant product.

8. A process of preparing a whippable composition which comprises adding a sequestering, water soluble, edible polyphosphate dissolved in water and an aqueous solution of an enzyme modified soy protein, spray drying the resultant solution and mixing the spray dried product with a spray dried, acid cured gelatin having a Bloom within the range from 100 to 300, and sodium aluminum sulfate, the approximate relative proportions of the components of the resultant product on a dry basis being:

| | Percent |
|---|---|
| Enzyme modified soy protein | 80.2 |
| Acid cured gelatin | 8.5 |
| Sequestering, water soluble, edible polyphosphate | 9.5 |
| Sodium aluminum sulfate | 1.8 |

References Cited in the file of this patent

UNITED STATES PATENTS

| 2,196,300 | Grettie | Apr. 9, 1940 |
| 2,271,654 | Littlefield | Feb. 3, 1942 |
| 2,520,581 | Turner et al. | Aug. 29, 1950 |
| 2,588,419 | Sevall et al. | Mar. 11, 1952 |

OTHER REFERENCES

"On Carrageen-*Chondrus crispus*," by Haas et al., The Annuals of Applied Biology (British), vol. 7, 1921, pages 352 to 362.